US 6,684,391 B1

(12) United States Patent
Stroetmann (10) Patent No.: US 6,684,391 B1
(45) Date of Patent: Jan. 27, 2004

(54) METHOD FOR OPERATING A COMPUTER SYSTEM, BYTE CODE VERIFIER AND COMPUTER SYSTEM

(75) Inventor: Karl Stroetmann, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 533 days.

(21) Appl. No.: 09/614,738

(22) Filed: Jun. 12, 2000

(30) Foreign Application Priority Data

Jun. 10, 1999 (DE) .......................................... 199 26 467

(51) Int. Cl.[7] ............................................... G06F 9/45
(52) U.S. Cl. ....................................... 717/148; 717/143
(58) Field of Search .................................. 717/148, 143

(56) References Cited

U.S. PATENT DOCUMENTS 5,668,999 A * 9/1997 Gosling ....................... 717/126
5,740,441 A * 4/1998 Yellin et al. ................. 717/134
5,748,964 A * 5/1998 Gosling ....................... 717/126
5,999,731 A * 12/1999 Yellin et al. ................. 717/126
6,075,940 A * 6/2000 Gosling ....................... 717/126
6,081,665 A * 6/2000 Nilsen et al. ................ 717/116

OTHER PUBLICATIONS

IBMTechnical Disclosure Bulletin, pp. 107–108, issue 11, vol 39, "JAVA Dynamic Class Loader". Nov. 1996.*
JAVA!, Tim Richey, pp. 325–343, Sep. 22, 1995.*

* cited by examiner

*Primary Examiner*—Todd Ingberg
(74) *Attorney, Agent, or Firm*—Staas & Halsey LLP (57) ABSTRACT

The invention is directed to a method for operating a computer system, as well as to a byte code verifier and to a computer system. The inventive method checks whether a computer program loaded onto a computer system exercises an illegal access to a variable, i.e. whether the variable is initialized before it is read. This test ensues before the execution of the program, so that such a test no longer need be performed upon execution of the program. The inventive method requires little memory space in the testing of the program and nonetheless carries out a complete test. Since the testing ensues before the execution of the program, the program execution itself is considerably speeded up since no further test is thereby required.

11 Claims, 4 Drawing Sheets

| Command | virtual stack | local variable |
|---|---|---|
| | [ ] | {1→ C, 2 → ?} |
| 1 goto 5 | | |
| | [ ] | { } |
| 2 aload 1 | | |
| | [ ] | { } |
| 3 astore 2 | | |
| | [ ] | { } |
| 4 goto 9 | | |
| | [ ] | {1→ C, 2 → ?} |
| 5 aload 2 | | |
| | [ ? ] | {1→ C, 2 → ?} |
| 6 getfield x | | |
| | [ ] | { } |
| 7 pop | | |
| | [ ] | { } |
| 8 goto 2 | | |
| | [ ] | { } |
| 9 return | | |

METHOD FOR OPERATING A COMPUTER SYSTEM, BYTE CODE VERIFIER AND COMPUTER SYSTEM

BACKGROUND OF THE INVENTION

1. Field of the Invention

The present invention is directed to a method for operating a computer system, to a byte code verifier and to a computer system.

2. Description of the Related Art

U.S. Pat. No. 5,668,999 discloses a method for operating a computer system that, following the loading of a computer program and before the execution of the computer program, checks this to see that it executes no disallowed data processing procedures. What is referred to as a byte code verifier, which checks the byte code of the loaded computer program, is provided for this purpose. The verifier contains a virtual stack for the temporary storage of type information that specify the data that lie on the stack in the execution of the program. The verifier further comprises a stack snapshot memory with a snapshot list and a snapshot memory area for storing the status of the virtual stack at different points of the program run.

The checking of the computer program ensues in two phases, whereby all destination addresses to which conditional or unconditional branches point are determined in the first phase. The program is simulated in the second phase. What are referred to as snapshots of the virtual stack are thereby produced for every destination address of the branch and are stored in the snapshot list. By comparing the information stored in the snapshot list, a determination is made as to whether the stack is manipulated in a way that could lead to an overflow or underflow. An error message is output if such an inadmissible change were to be caused.

The employment of such a byte code verifier allows a considerable speed-up of the execution of the program. Traditional interpreters for the execution of a computer program contain routines for monitoring the stack and for avoiding an overflow or, respectively, underflow. These routines were executed at every command accessing the stack. Monitoring the stack could therefore take up to 80% of the execution time of a computer program. The employment of the byte code verifier is advantageous particularly given loops, since only the commands of one loop run are checked a single time with the byte code verifier, in contrast whereto the individual commands have been rechecked in each loop run given a traditional interpreter.

The virtual stack is constructed like a regular stack, except that, instead of the actual data and constants, indicators are stored in the virtual stack that represent the respective data type such as, for example, whole number (I), long whole number (L), singly-exact floating decimal point number (F), doubly-exact floating decimal point number (D), byte (B), etc.

A virtual field of the local variables is also established in this known method. This virtual field is constructed similar to the virtual stack, i.e. only the indicators of the data types of the data to be stored in the actual memory field are contained in the virtual field.

Given branches in the program execution, however, only snapshots of the virtual stack are compared to one another. Changes in the virtual field remain unconsidered, so that errors produced on the basis of branches cannot be detected given access to the field of the local variables. This can lead to errors in the program execution that deteriorate the operation of the computer system and can even lead to a crash of the computer system.

U.S. Patent No. 5,668,999 discloses the byte code verifier with reference to the computer language OAK. The computer language Java™ has been developed from OAK. Due to its independence from platform, Java™ is often employed in Internet applications that are loaded from a server onto an arbitrary client, whereby the client can be a computer system with an arbitrary, standard operating system.

The reference Java™ Virtual Machine Specification, Tim Lindholm and Frank Yellin, Addison-Wesley, 1997 (ISBN 0-201-63452-X), pp. 128 ff., describes a byte code verifier that essentially corresponds to that of U.S. Pat. No. 5,668,999 but differs therefrom in that it is not only copies of the virtual stack but also copies of the virtual field of the local variables that are produced with the snapshots. Given a conditional or unconditional branch in the program execution, it is not only the snapshots of the stacks but also those of the virtual fields of the local variables that are compared, so that an error produced by an access to the variable field implemented after a branch can also be detected.

Producing a complete copy of the virtual field of the local variables for the destination address given a branch produces a considerable dataset that uses a correspondingly large memory space. Since OAK and Java were developed not only for Internet applications but, in particular, for embedded applications with small processor systems, this substantial memory requirement opposes the original objective. There is a considerable need for a reduction of the memory requirements particularly for specific developments of Java such as, for example, JAVACARD, which is a programming language specifically designed for chip cards.

SUMMARY OF THE INVENTION

The present invention is therefore based on the object of developing a method of the species disclosed by U.S. Pat. No. 5,668,999, a byte code verifier and a computer system such that a dependable execution of a computer program loaded on a computer system is nonetheless assured given low memory requirements.

This object and others are achieved by a method having for operating a computer system, including the following steps: storing a computer program in a memory of the computer system, whereby the computer program comprises a sequence of byte codes that represent program commands, whereby the program commands can access variables; testing the computer program loaded into the computer system before the execution of the computer program to see whether the program commands contained therein would produce an inadmissible data processing event upon execution; allowing execution of the program when the test of the computer system has yielded no inadmissible data processing event, otherwise a corresponding error message is output; and testing the individual program commands in the sequence of the program execution in the test of the computer program to see whether they access a variable upon execution before this variable has been initialized.

Advantageous developments of the invention are provided by a method for operating a computer system, in that, when testing the computer program, a virtual stack is checked to see whether an overflow or an underflow of the virtual stack is produced due to an illegal data processing event. In the method, a virtual field of local variables is generated wherein indicators that represent the respective data type are stored instead of the data and constants that are entered into a corresponding, actual field of local variables upon execution of the computer program. Preferably, whether each local variable of the field has been initialized before the accesses is successively checked for each local variable of the field when testing the computer program. When testing the computer program, the program commands are interrogated in the sequence of the program execution to see whether a specific variable is initialized by the respective program command, and, if this interrogation yields that the variable is not initialized by this program command, an interrogation is carried out to see whether this variable is accessed by this program command, and, if this interrogation yields that this variable is accessed, an error message is output and the execution of the computer program is not allowed. When it is found in the interrogation about the access onto the variable that the variable is not accessed, all program commands that can follow the program command just tested in the program execution are identified, and a determination is made as to whether one or more of these program commands have already been tested, and, if one or more untested program commands thereby derive, these are tested according to the method steps in set forth above. When no untested program command is found, the computer program is tested for the next variable, and the testing process is ended when all variables have been tested. In the method for operating a computer system, when it is found in the interrogation as to whether a specific variable is initialized by the respective program command that the variable is initialized by the program command, an interrogation is carried out to see whether further program commands that do not follow the program command just tested must be tested for this variable and, when such further program commands derive, then these are tested according to the method steps above; otherwise, the computer program is tested for the next variable and the testing process is ended when all variables have been tested.

The invention also provides a byte code verifier that tests a program loaded onto a computer system for illegal data processing events before its execution, the byte code verifier being fashioned such that the program commands of the computer program are checked in the sequence of the program execution to see whether they access a variable upon execution before this variable is initialized. Preferably, the byte code verifier is implemented for the execution of the method as set out in the foregoing. The byte code verifier may be stored on a data carrier.

The invention also provides a computer system having a memory for storing a computer program, whereby the computer program comprises a sequence of byte codes that represent program commands, some program commands can access variables, a data processing unit for executing programs stored in the memory, a byte code verifier stored in the memory, the byte code verifier testing a program loaded into the memory of the computer system for illegal data processing events before its execution, and the byte code verifier being fashioned such that the computer program is tested to see whether, upon execution thereof, variables have been respectively initialized before possible accesses to the variables. In a preferred embodiment, the computer system includes the byte code verifier as described herein.

The inventive method for operating a computer system comprises the following steps:
a) Storing a computer program in a memory of the computer system, whereby the computer program comprises a sequence of byte codes that represent program commands, whereby the program commands can access variables;
b) Testing the computer program loaded into the computer system before the execution of the computer program to see whether the program commands contained therein would produce an inadmissible data processing event upon execution; and
c) The execution of the program is allowed when the test of the computer system has yielded no inadmissible data processing event, otherwise a corresponding error message is output.

The inventive method is characterized in that whether variables have been previously initialized is checked before the accesses to variables when testing the computer program.

Figure 3:
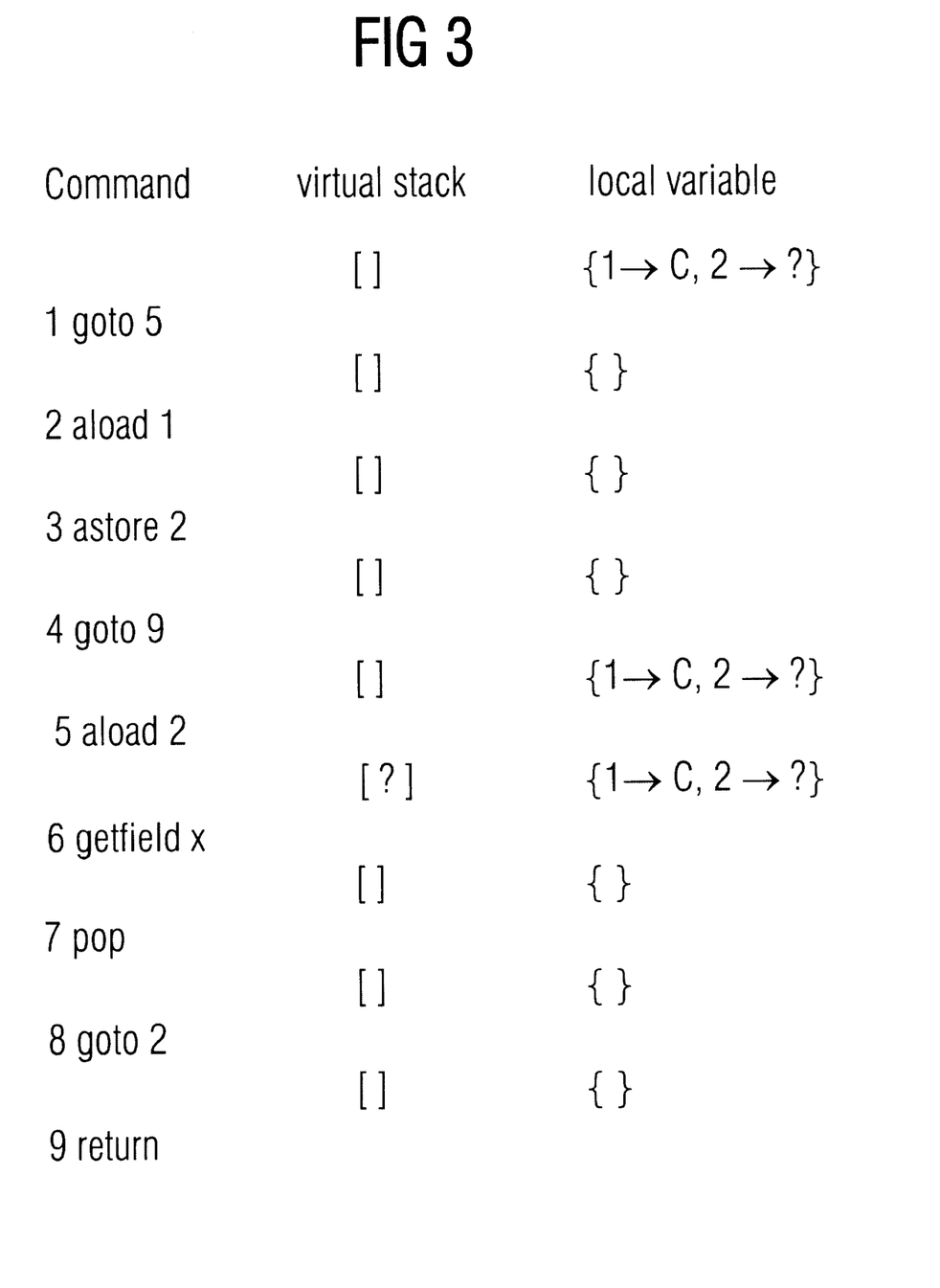
FIG. 3 is a listing of a program example.

The inventor has recognized that inadmissible data processing events are not recognized with the method disclosed by U.S. Pat. No. 5,668,999 given branches in the program execution. FIG. 3 shows an example of a program that comprises an inadmissible data processing event that is not recognized by this known method. In the illustration of FIG. 3, the respectively program command is shown in the left-hand column, the content of the virtual stack is shown in the middle column and the content of the virtual field of the local variable is shown in the right-hand column. The program commands are numbered consecutively. With the first command "goto 5", the program execution branches to command number 5 (aload 2). The content of the variable 2 of the virtual field is thereby loaded onto the stack. The variable 2 should contain an indicator for a data type such as, for example, "C". Since, however, the program commands 2 through 4 were skipped and the variable 2 would be occupied with a value for the first time with command 3 (astore 2), the variable 2 has not yet been occupied with a value given the execution of command 5. In other words, the variable 2 has not yet been initialized given the execution of the command 5. If the program were executed, the variable 2 would be read with the command 5, even though a value has not yet been assigned here. This produces an undefined condition since non-extant data are read in an inadmissible way. Such program executions can lead to undefined conditions of the computer system or could even produce a crash of the entire computer system.

With the inventive method, a check is carried out to see whether, given access to a variable (command No. 5), the variable has been previously initialized. In the test, the individual commands of the computer program are investigated in the sequence with which they are carried out given an execution of the computer program, whereby the individual program branches given a branch of the program execution are investigated independently of one another. The execution of the program is allowed only when it is assured that the variables are initialized before they are accessed, i.e. occupied with a value. As a result thereof, an inadmissible access to a variable is reliably prevented and undefined conditions of the computer system are avoided.

The need for additional memory space of a byte code verifier that is provided with a routine for checking the computer program whether variable have been previously initialized before being accessed is significantly less than if a virtual field of local variables were to be copied for each destination of a conditional or unconditional branch.

Given low memory space requirements, thus, a dependable execution of a computer program loaded on a computer system is assured with the inventive method since inadmissible data accesses in the field for local variables can also be detected in the determination of inadmissible data processing events.

BRIEF DESCRIPTION OF THE DRAWINGS

The invention is described in greater detail by way of example below on the basis of the drawings.

DETAILED DESCRIPTION OF THE PREFERRED EMBODIMENTS

Figure 1:
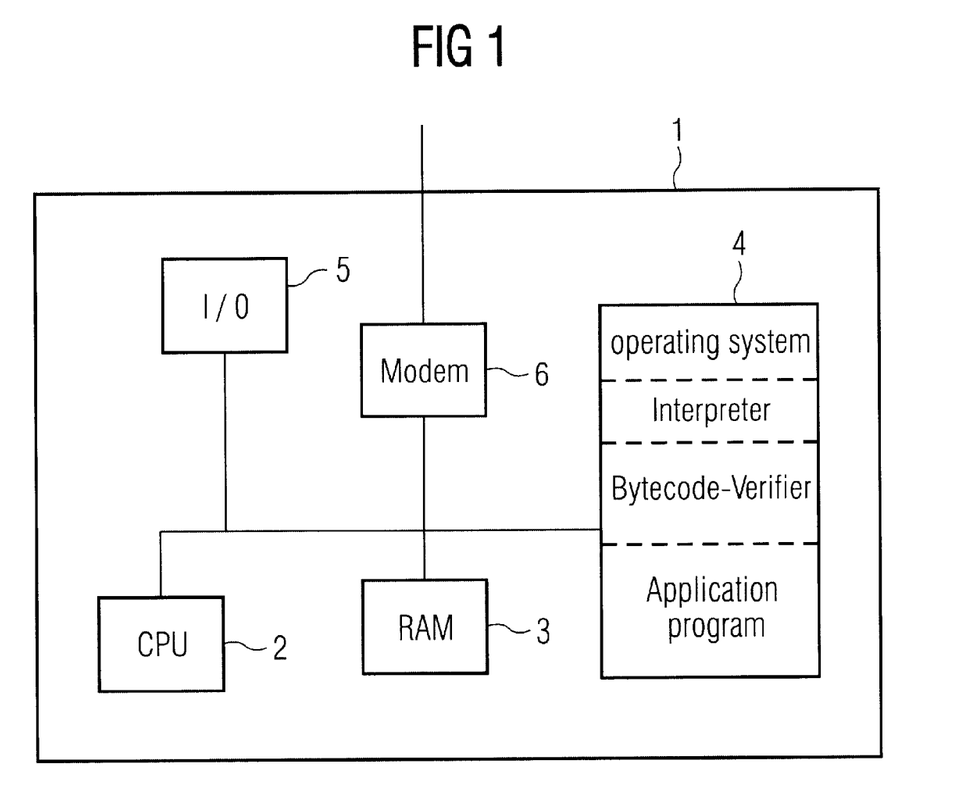
FIG. 1 is a block diagram showing a schematically simplified computer system at which the inventive method is implemented.

FIG. 1 shows a computer system at which the inventive method can be implemented. The computer system 1 comprises a central processing unit (or CPU) 2 that collaborates in a known way with a volatile memory (or RAM) 3 and a non-volatile memory 4. The non-volatile memory 4 is usually composed of a hard disk on which the programs needed for the operation of the computer system 1 such as, for example the operating system and further application programs are stored. The computer system I comprises an I/O (input-output) unit 5 with which a user can input data into the computer system or, respectively, at which data can be displayed to the user. Such an I/O unit 5 is usually composed of a keyboard, a picture screen and of a disk drive. A data connection to a further computer system can be set up with a modem 6. For example, programs can be loaded from this further computer system onto the present computer system 1 and can be stored in the memory 3 and 4.

A byte code verifier is installed at the computer system 1 for checking the computer programs loaded onto the computer system 1. The byte code verifier essentially corresponds to the byte code verifier known from U.S. Pat. No. 5,668,999 or from the reference Java™ Virtual Machine Specification, Tim Lindholm and Frank Yellin, Addison-Wesley, 1997 (ISBN 0-201-63452-X), pp. 128 ff. Such byte code verifiers are, in particular, utilized in platform-independent computer languages such as OAK and Java.

Inventively, the byte code verifier is fashioned such that, when testing the computer program, a check is also carried out as to whether variables have already been initialized before access to variables, i.e. have been occupied with a value, so that a defined value can be read when accessing the respective variable and an undefined condition is not produced.

The routine for testing the access onto the variables is presented below in pseudo-code:

```
while isOK ^ (locVar ≤ numberVars)
    then if frontier = [ ]
        locVar := locVar + 1
        visited := Ø
        frontier := [1]
    else first := car(frontier)
        rest := cdr(frontier)
        visited := {first} ∪ visited
        if initVar(P(first),locVar)
            then frontier := rest
            else if readVar(P(first),locVar)
                then isOk := false
                else frontier := select (possibleNext
```

*-continued*

```
                                    (first), visited) * rest
            end-if
        end-if
    end-if
end-while
```

Figure 2:
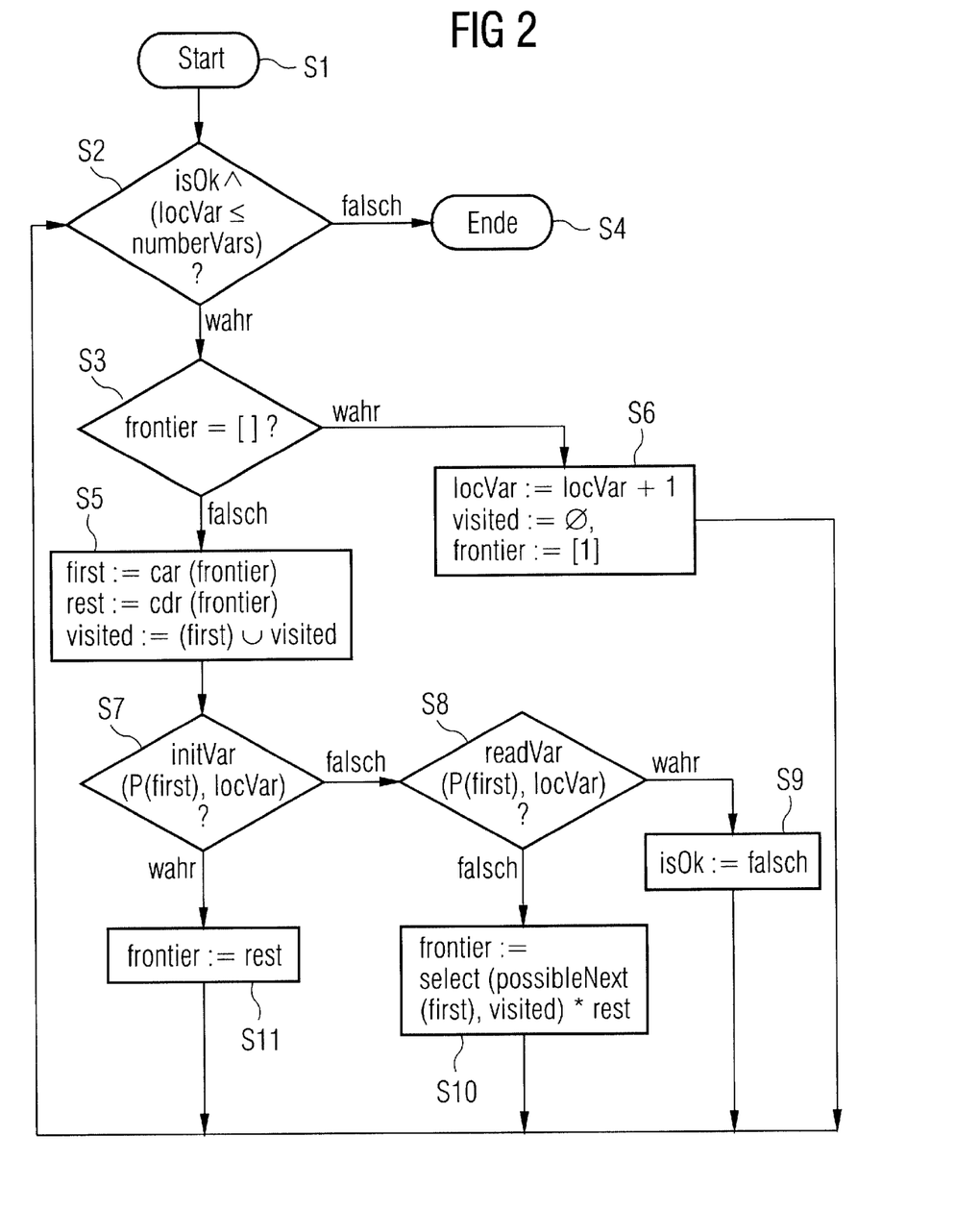
FIG. 2 is a flowchart of the inventive method.

FIG. 2 shows a flowchart that shows the routine presented above in pseudo-code.

The individual elements of this routine have the following significance:

isOK is a Boolean variable that can assume the values true and false. It is occupied with the value true in advance and is occupied with false when an inadmissible data processing event is detected on the check of the computer program.

locVar is a counter that can be occupied with whole positive numbers. locVar serves for counting the local variables of a corresponding field. locVar is initialized with the plurality z of parameters that are handed over thereto when the program is called. It is thereby assumed that the parameters are successively imaged onto the variables 1 through z.

numberVars is a function that outputs a whole number that corresponds to the length of the variable field.

frontier is a list that can contain a plurality of whole-numbered elements, whereby numbers of commands that are still to be tested are contained in this list.

visited is a set of whole numbers that contains the numbers of commands that have already been tested.

car(Liste) is a function that supplies the first element of a list.

Car is a function that supplies the rest of the list 1, whereby the rest covers all elements of the list 1 except the first element.

initVar (instr, n) is a function that yields a true when the command instr writes a value into the local variable with the number n, as a result whereof this variable is initialized.

readVar (instr, n) is a function that yields true when the command instr reads the local variable with the number n and thus accesses this local variable.

possibleNext (1); is a function that yields the list of all numbers of the commands that can follow the command with the number 1 upon execution of this command with the number 11. When the command 1; contains no branch instruction, then only a single command can follow this command, so that possibleNext yields only a single value. When, in contrast, the command with the number 1 contains a conditional branch instruction, then, dependent on meeting the condition, two different commands can follow the command with the number 1, as a result whereof the function possibleNext yields a list with two values.

select (1,s) is a function that removes the elements that are present in the set s from the list 1; 11*12 is a function that attaches the elements of the list 12 to the elements of the list 11

The routine is explained in greater detail below on the basis of the above presentation in pseudo-code and on the basis of FIG. 2. The routine is started with the step S1 (FIG. 2). Whether isOK is true and whether locVar is less than or equal numberVars is subsequently interrogated (S2). When this interrogation yields true, the program execution goes to step S3. When the interrogation yields the value 'false', then a branch is made to the end of the program (S4) since either all local variables have been tested—when locVar is greater than numberVars—or when the value of isOK is 'false',. i.e. when an inadmissible data processing event has been found. In the above-recited routine, this query is implemented in the form of an if, then, end-if instruction.

Whether the list 'frontier' is empty is interrogated in step S3. When the list 'frontier' is empty, the program execution goes to the step S6, with which the counter locVar is incremented by one, the set 'visited' is occupied with the empty set, and the list 'frontier' is occupied with a list that is composed only of the element 1. After execution of the step S6, the program execution goes back to the step S2, whereby the interrogation in the step S3 then yields the value 'false' because the list 'frontier' contains an element. The program execution goes to the step S5, whereby the respectively first element of the list 'frontier' is added to the set 'visited' since the command corresponding to the first element of the list 'frontier' is tested in the following program steps.

Whether the command P(first) of the program P with the number 'first' initializes the local variable with the number locVar is interrogated in step S7. This query is implemented with the above-explained function 'initVar'. When the result of this interrogation is the value 'false', then the program execution goes to the query S8 with which a check is carried out to see whether the command P(first) with the number 'first' reads the local variable with the number locVar, i.e. accesses it. When the query in step S8 yields that the command P(first) with the number 'first' accesses this local variable, then the variable isOK is occupied with the value 'false' in step S9.

When, in contrast, the query in step S8 yields that the command P(first) with the number 'first' does not access this local variable, i.e. that the value of the query is 'false', the program execution branches to the step S10 in which the list 'frontier' is newly occupied. The occupation of the list 'frontier' ensues with the function 'possibleNext' of 'first' that determines all program commands that can follow the command having the number 'first'. When this command comprises a conditional branch, then two different commands can follow this command, in contrast whereto only a single command can follow given a command without branch or with an unconditional branch. The result of the function 'possibleNext' is operated with the set 'visited' on the basis of the function 'select', so that only those commands following the command with the number 'first' that have not yet been tested remain in the list 'frontier'. Further, all remaining commands or, respectively, the numbers pointing thereto remain in the list 'frontier'. With the step S10, thus, all those commands following the currently tested command that have not yet been tested are added to the list 'frontier'.

When the query in step S7 yields that the command P(first) having the number 'first' initializes the local variable having the number 'locVar', i.e. occupies it with a value, the result of the query is 'true' and the program execution goes to step S11 with which the element 'first' is removed from the list 'frontier' without substitute and wherein only the remaining elements (rest) remain. From steps S9, S10 and S11, the program execution returns to step S2.

The functioning of this routine is explained in greater detail below on the basis of the program example shown in FIG. 3.

The routine begins with the step S1, whereby an empty set is allocated to the set 'visited' and an empty list is allocated to the list 'frontier' and the variable isOK is occupied with the value 'true' at the beginning of the program. The counter locVar is set to 1 since one parameter is handed over to the program (1→C; see FIG. 3).

There are two variables in the program example, for which reason the content of locVar in step 2, which is initially 1, is smaller than the result numberVars, which is equal to 2, for which reason the query locVar≦numberVars yields the value 'true', and the program execution goes to the step S3 since the value of the variable isOK is also 'true'. Since the list 'frontier' is empty, the program execution goes to the step S6 wherein the value of the counter locVar is incremented by one and, thus, is 2; the set 'visited' is again occupied with the empty set; and the list 'frontier' is occupied with the list that comprises the number 1 as only element.

A renewed query in step S2 again yields the value 'true' since isOK continues to be 'true' and the value of the counter locVar is equal to the plurality of variables. The following query in the step S3 yields the value 'false' since the list 'frontier' now contains the element 1. The program execution thus goes to step S5. In step S5, the first element from the list 'frontier', the only element, namely the element 1 in the present case, is added to the set 'visited'.

Whether the program command with the number 1 (goto 5) initializes the variable 2 is checked with the function initVar in the following step S7.

The query in step S7 yields the value 'false' for the command 1 and the variable 2 since the variable 2 is not initialized with the command 1. The program execution therefore goes to the query S8, with which a check is carried out as to whether the command 1 (goto 5) reads the variable 2. Since this is not the case, the value of the query S8 is 'false', the program execution thus going to the step S10. In step S10, those commands in the program execution following the command 1 that have not yet been tested are assigned to the list 'frontier'. In the program example, the command 5 (aload 2) follows the command 1 since the command 1 (goto 5) executes a branch to the command 5.

The program execution again switches to the step S5 via steps S2, S3, the element 5 for the command number 5 being added to the set 'visited' therewith. The query in step S7 yields that the command 5 (aload 2) does not initialize the variable 2. The value of the query S7 is therefore 'false' and the program execution branches to the step S8. The query in step S8 yields that the command 5 reads the variable 2 (aload 2), as a result whereof the result of the query S8 is 'true' and the program execution branches to the step S9.

This result of the query in step S8 means that the variable 2 has been read with the program command 5 without having been previously initialized. Upon execution of the exemplary program, an undefined program condition would thus arise. This is shown with the question mark in the stack in FIG. 3. When testing the exemplary program, the variable isOK is therefore occupied with the value 'false' in step S9. The program execution now goes to the step S2, whose query yields the value 'false' since the variable isOK is occupied with the value 'false'. The program execution thus branches from the step S2 onto the step S4, the routine being thus ended.

Figure 4:
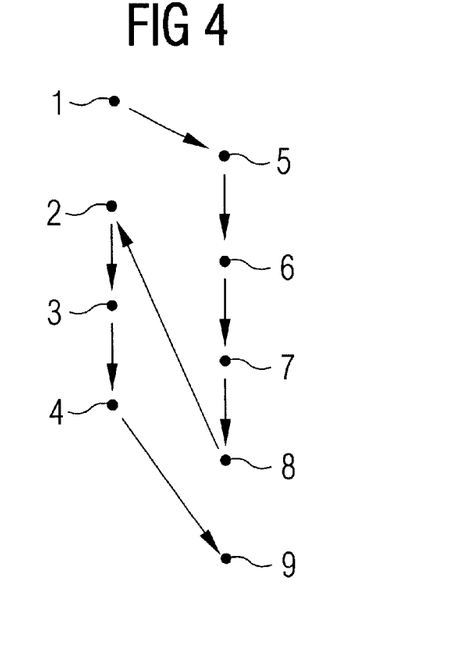
FIG. 4 is a flowchart of the program example from FIG. 3.

FIG. 4 schematically shows the program execution of the program example of FIG. 3, whereby each command is illustrated with a dot with the appertaining number and respective arrows point from the individual commands to the following command in the program execution. The test of the variable 1 is skipped with the above-described routine since it has been previously initialized by the parameter input and locVar is therefore set to 1. The commands 1 and 5 are processed in the sequence of the program execution in order to test an access infraction to the variable 2. Since such an access infraction occurs at the command 5, this is detected and further testing is aborted.

Figure 5:
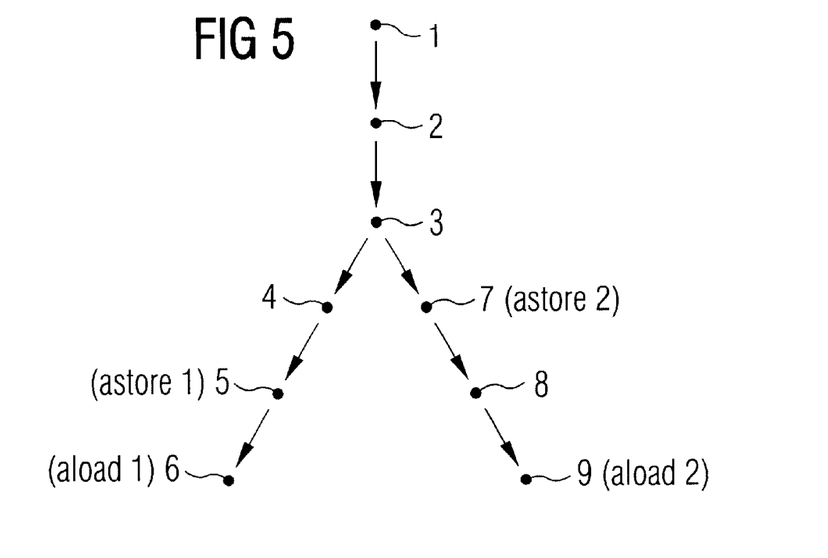
FIG. 5 is a further flowchart with a branching of the program execution.

FIG. 5 shows a program execution of another program example that is not described in detail. This program example again comprises two variables, whereby a conditional branch to the command 7 is provided at the command 3. The commands 1, 2, 3, 4 and 8 neither initialize one of the two variables nor do they access them. After the command 3, the program execution branches to the command 4 or, respectively, to the command 7 and the respective commands coming thereafter. The variable 1 is initialized with the command 5 (astore 1) and the variable 2 is initialized with the command 7 (astore 2). When testing this program example with the aforementioned routine, the program example is checked for an illegal access to the variable 1. The individual commands are thereby tested in the sequence 1, 2, 3, 4, 5, 7, 8, 9. After processing the command 3, the commands 4 and 7 are entered into the list 'frontier' since both can follow the command 3. First, the commands 4 and 5 are processed, whereby this branch is aborted at the command 5 since the variable 1 is initialized here. Commands 7, 8 and 9 are then processed.

When checking an access infraction with respect to the variable 2, the commands are correspondingly processed in the sequence 1, 2, 3, 4, 5, 6 and 7, whereby the branch after the command 3 is again taken into consideration and the processing of the branch beginning with the command 7 is aborted at the command 7 since the variable 2 is initialized here.

The program commands of a program are thus tested in the sequence of the program execution with the above-described routine, whereby, given a branch of the program execution, the individual branches of the program execution are separately investigated until either the corresponding variable is initialized or an access infraction is detected.

A byte code verifier supplemented by the inventive routine enables a complete testing of a computer program loaded on a computer system with minimal memory space requirements. Additional memory space is only required for storing the routine, the set 'visited' and the list 'frontier'. The set 'visited', however, is at most as large as the program to be tested. The same is true of the list 'frontier'. The memory space requirements are thus substantially less than given a known byte code verifier, whereby the virtual field for the local variables is copied for each branch address.

The byte code verifier provided with the inventive routine can be installed in a computer system stored on a data carrier or can be loaded onto a computer system via a data network. Such a byte code verifier is employed for testing the program code of computer programs, particularly those that are written in a platform-independent programming language such as, for example, OAK or Java. This program code is also referred to as byte code.

The invention can be summarized in the following way.

The invention is directed to a method for operating a computer system, as well as to a byte code verifier and a computer system.

A check is carried out with the inventive method to see whether a computer program loaded onto a computer system exercises an illegal access to a variable, i.e. whether the variable is initialized before it is read. This test ensues before the execution of the program, so that such a test no longer need be performed upon execution of the program.

The inventive method requires little memory space in the testing of the program and nonetheless performs a complete test. Since the test ensues before the execution of the program, the program execution itself is considerably speeded up since no further testing is thereby required.

Although other modifications and changes may be suggested by those skilled in the art, it is the intention of the inventor to embody within the patent warranted hereon all changes and modifications as reasonably and properly come within the scope of their contribution to the art.

I claim:

1. A method for operating a computer system, comprising the steps of:

storing a computer program in a memory of the computer system, the computer program including a sequence of byte codes that represent program commands, the program commands being capable of accessing variables;

testing the computer program loaded into the computer system before execution of the computer program to see whether the program commands contained therein would produce an inadmissible data processing event upon execution;

enabling execution of the program when the test of the computer system has yielded no inadmissible data processing event, otherwise outputting a corresponding error message; and testing individual program commands in a sequence of the program execution in the test of the computer program to see whether they access a variable upon execution before this variable has been initialized.

2. A method for operating a computer system as claimed in claim 1, further comprising the step of:

when testing the computer program, checking a virtual stack to see whether an overflow or an underflow of the virtual stack is produced due to an illegal data processing event.

3. A method for operating a computer system according to claim 1, further comprising the step of:

generating a virtual field of local variables wherein indicators that represent the respective data type are stored instead of the data and constants that are entered into a corresponding, actual field of local variables upon execution of the computer program.

4. A method for operating a computer system according to claim 3, further comprising the step of:

successively checking whether each local variable of the field has been initialized before the accesses for each local variable of the field when testing the computer program.

5. A method for operating a computer system according to claim 1, further comprising the steps of:

when testing the computer program, interrogating the program commands in the sequence of the program execution to see whether a specific variable is initialized by the respective program command, and, if said interrogating step yields that the variable is not initialized by this program command, carrying out an interrogation to see whether said variable is accessed by this program command, and, if said interrogating step yields that said variable is accessed, outputting an error message and disabling execution of the computer program.

6. A method for operating a computer system according to claim 5, further comprising the steps of:

when it is found in the interrogation about the access onto the variable that the variable is not accessed, identifying all program commands that can follow the program command just tested in the program execution, and making a determination is made as to whether one or more of these program commands have already been tested, and, if one or more untested program commands thereby derive, testing the untested program commands.

7. A method for operating a computer system according to claim 6, further comprising the steps of:
   when no untested program command is found, testing the computer program for a next variable, and
   ending the testing process when all variables have been tested.

8. A method for operating a computer system according to claim 5, further comprising the step of:
   when it is found in the interrogating step as to whether a specific variable is initialized by the respective program command that the variable is initialized by the program command, carrying out an interrogation to see whether further program commands that do not follow the program command just tested must be tested for this variable and,
   when such further program commands derive, then testing said further program commands including:
      when it is found in the interrogation about the access onto the variable that the variable is not accessed, identifying all program commands that can follow the program command just tested in the program execution, and
      making a determination is made as to whether one or more of these program commands have already been tested, and,
      if one or more untested program commands thereby derive, testing the untested program commands;
   otherwise, testing the computer program for the next variable and ending the testing process when all variables have been tested.

9. A byte code verifier that tests a program loaded onto a computer system for illegal data processing events before its execution, comprising:
   a byte code verifier is fashioned such that the program commands of the computer program are checked in the sequence of the program execution to see whether they access a variable upon execution before this variable is initialized.

10. A byte code verifier according to claim 9, wherein said byte code verifier is stored on a data carrier.

11. A computer system, comprising:
   a memory for storing a computer program, the computer program including a sequence of byte codes that represent program commands, some program commands can access variables,
   a data processing unit for executing programs stored in the memory,
   a byte code verifier is stored in the memory, said byte code verifier testing a program loaded into the memory of the computer system for illegal data processing events before its execution, the byte code verifier is fashioned such that the computer program is tested to see whether, upon execution thereof, variables have been respectively initialized before possible accesses to said variables.

* * * * *